United States Patent [19]

Blomgren, Jr.

[11] 4,304,036

[45] Dec. 8, 1981

[54] WHEEL HUB MOVING TOOL

[75] Inventor: Oscar C. Blomgren, Jr., Lake Forest, Ill.

[73] Assignee: Tuxco Corporation, North Chicago, Ill.

[21] Appl. No.: 145,220

[22] Filed: Apr. 30, 1980

[51] Int. Cl.³ .............. B23P 19/04

[52] U.S. Cl. .............. 29/426.5; 29/256

[58] Field of Search .............. 29/256, 259, 263, 239, 29/237, 426.5; 254/213; 269/902

[56] References Cited

U.S. PATENT DOCUMENTS

| | | | |
|---|---|---|---|
| 1,587,689 | 6/1926 | Weiss et al. | 29/256 |
| 2,472,040 | 5/1949 | Brookfield | 269/902 X |
| 3,416,763 | 12/1968 | Moreno | 254/213 X |
| 3,727,289 | 4/1973 | Bemelmann et al. | 29/237 |
| 4,054,984 | 10/1977 | Ball et al. | 269/43 X |

*Primary Examiner*—Robert C. Watson

*Attorney, Agent, or Firm*—Neuman, Williams, Anderson & Olson

[57] ABSTRACT

A wheel hub moving tool has a pair of diametrically opposed clamping members adapted to cooperatively clamp the tool on a wheel axle. A specifically designed link chain pivotally secured to one of the clamping members embraces a portion of the axle to assist the clamping members in resisting axial movement of the tool while moving the wheel hub. An axially disposed threaded bolt engages an entrapped nut supported on one of the clamping members whereby rotation of the bolt causes the bolt to move axially with respect to the clamping members and thus push the hub away from the clamping members. A rotatable spool is provided on one of the clamping members. A flexible strap which may be secured to the hub and wound on the spool is used to pull the hub toward the clamping members.

8 Claims, 8 Drawing Figures

FIG. 1
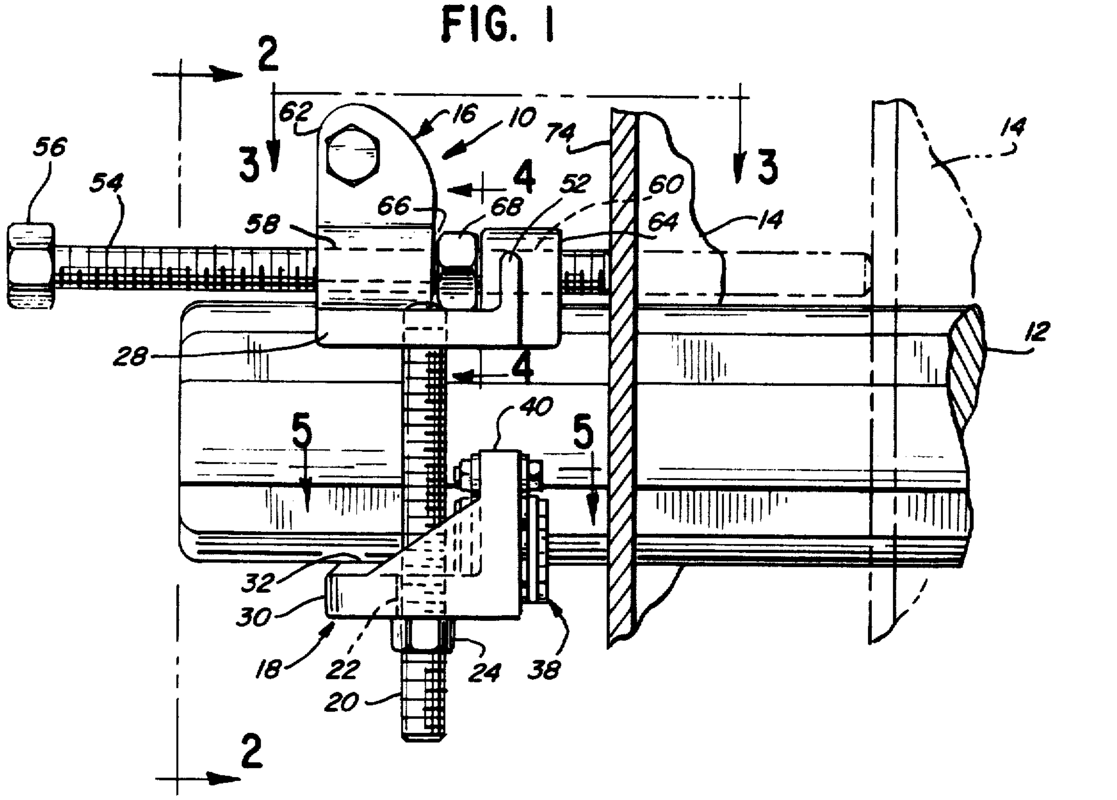
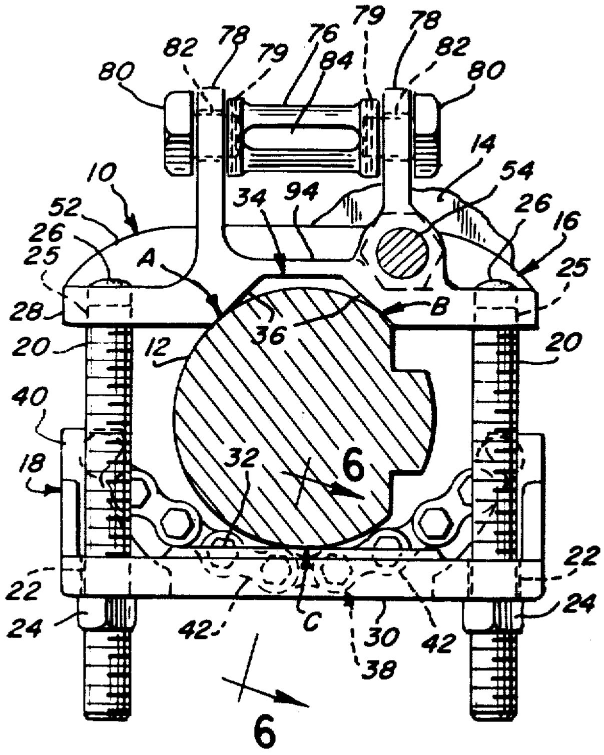
FIG. 2
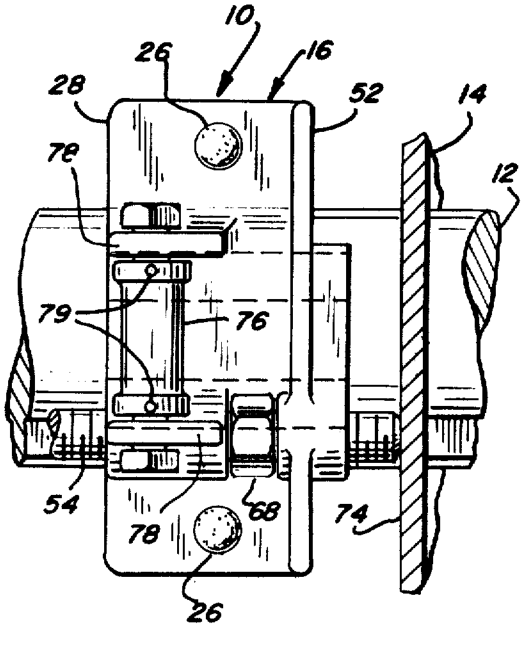
FIG. 3

FIG. 4
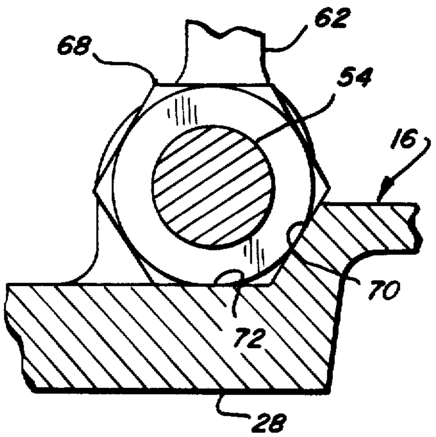
FIG. 5
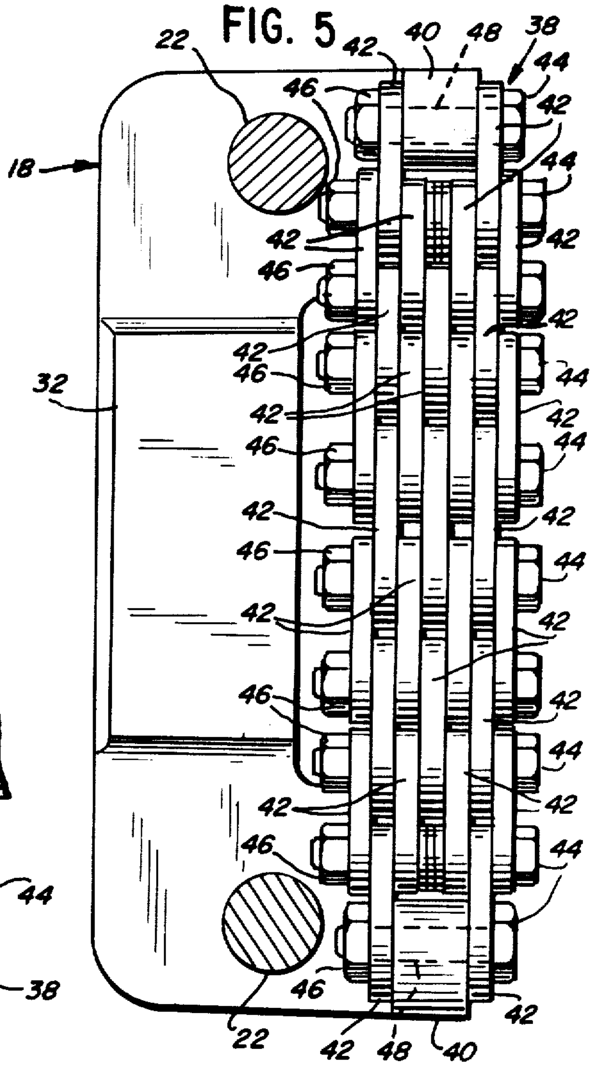
FIG. 6
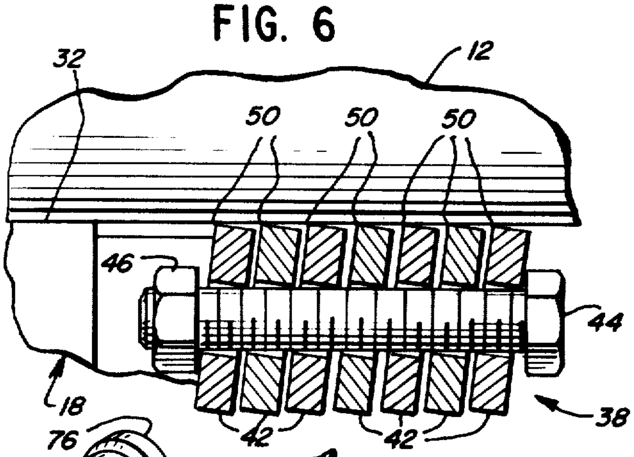
FIG. 8
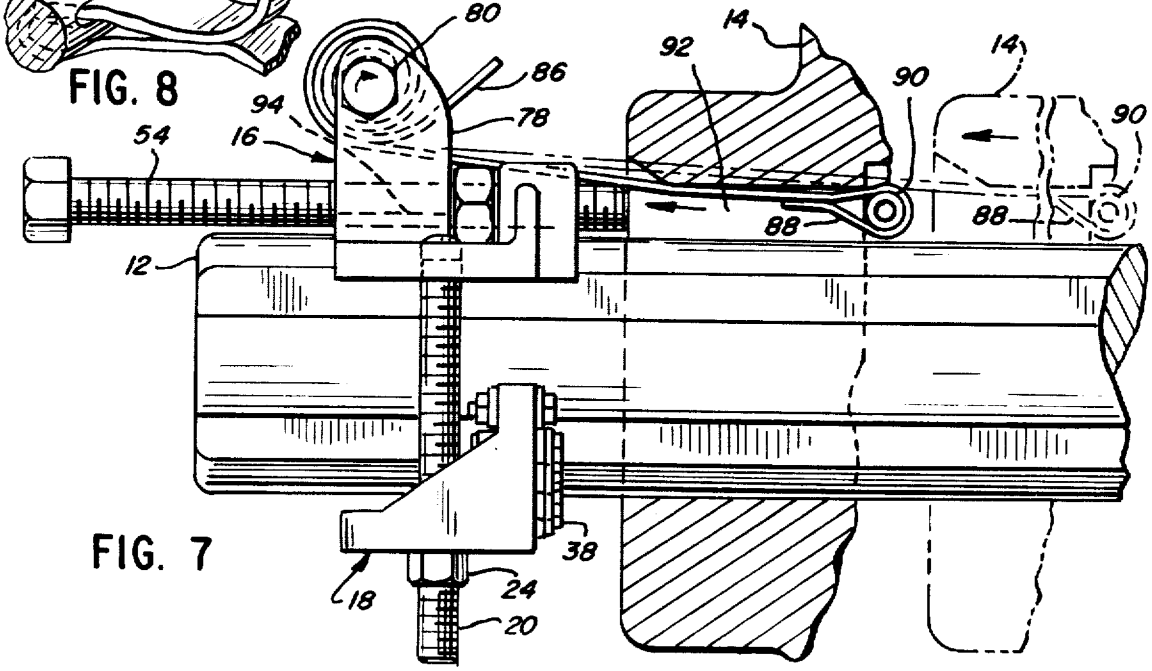
FIG. 7

WHEEL HUB MOVING TOOL

This invention relates in general to a wheel hub moving tool, and more particularly to a portable tool for moving the wheel hub of a farm tractor or the like axially along its supporting axle.

In recent years farm tractors have increased dramatically in both size and power. Commensurate with these increases, tractor wheels and tires have increased substantially in both size and weight. Many large tractors are now provided with four wheel drive, and the smaller front steering wheels used previously have given way to a second pair of giant size drive wheels and tires. Additionally, large tractor tires are frequently weighted with cast iron weights attached to the wheel hubs and this may add as much as a thousand pounds to the weight of each wheel. Also, large tires are sometimes filled with a calcium chloride or other solution to provide still additional weight, and such solution may add as much as two thousand pounds of liquid ballast to the weight of the tires. This additional unsprung weight increases the pulling power of the tractor in direct proportion to the weight added. Accordingly, in many instances the total weight of the wheel and tire, including the additional cast iron weights and liquid ballast, may exceed two tons.

While the increased size and weight of modern farm tractors have provided for greater efficiency and other advantages, these increases have introduced other problems. Because farm tractors are generally intended to perform work in connection with various row crops wherein the spaced-apart distances between the rows vary widely, the axles which support the tractor wheels are substantially longer than might otherwise be necessary so that the wheels can be secured at different axial positions along the axles. This enables the farmer to change the axial distance between the wheels on each axle to accomodate the tractor to the particular row crop he is working.

While this flexibility is both desirable and necessary, difficult problems are encountered in moving the wheels back and forth along the axles of the tractor. The magnitude of the difficulty depends upon a number of factors. One such factor is the type of clamping method, such as the use of key ways, wedge lock devices, or other means by which the tractor manufacturer locks the wheel assemblies to the axle. Another factor is the size and overall weight of the wheel and tire assembly to be moved. Yet another factor is the age of the tractor and the degree of corrosion between the wheel hub and the axle. Heretofore, a combination of the foregoing factors has usually made axial movement of tractor wheels physically exhausting, sometimes impossible and exceedingly dangerous.

Prior to actually moving the tractor hub or wheel assembly axially on its axis, certain preliminary steps must normally be taken. The tractor should preferably first be moved to a level, hard surface where the tractor must be jacked up so that the wheel assembly or hub to be moved does not touch the ground. That done, the clamping device, such as wedge lock or key employed to lock the wheel hub to the axle, must be loosened or released.

Heretofore, after these initial steps have been completed, subsequent steps have varied depending upon the initial axial position of the wheel assembly on its supporting axle. For example, if the wheel was very close to the differential housing and tractor body the wheel could only be pulled outwardly toward the end of the axle because there was insufficient room between the wheel assembly and tractor body for one or more persons to get behind the wheel to push it. In this situation it was heretofore necessary for two or more men to grab the tread of the tire on opposite sides of the axle and by coordinating their efforts attempt to pull or "walk" the wheel assembly outwardly along its axle. A rocking motion and considerable physical effort was required. After the wheel had been moved out a foot or more it may have been possible for a man to get behind the wheel, under the tractor's fender, and continue the rocking motion in a pushing fashion. The danger in following this procedure is readily evident. If the rocking motion should cause the tractor to fall off its jack or cause the wheel to be pushed clear of the axle and fall to the ground, serious injury could occur.

The invention overcomes the foregoing problems and provides a portable tool for moving a wheel assembly or hub of a farm tractor or the like axially in either direction along its supporting axle. The tool can be operated by one person with the assistance of only a socket wrench.

The wheel hub moving tool of the invention includes a pair of diametrically opposed clamping members adapted to cooperatively embrace the periphery of the axle along at least three axial lines of contact parallel to the axis of the axle and a link chain pivotally secured to one of said pair of clamping members and adapted to embrace a peripheral portion of said axle. The links of the chain are axially spaced apart slightly on their respective connecting bolts or pins whereby when the tool is clamped on the axle the slightest axial movement of the tool along the axle causes the links embracing the periphery of the axle to pivot slightly from a plane perpendicular to the axis of the axle so that the sharp edges of the links grip the axle to resist further axial movement of the tool.

The tool of the invention includes an elongated threaded bolt supported on one of the clamping members and axially movable with respect to that clamping member, the bolt having an axis of rotation parallel to the axis of the axle and proximate to the axle when the tool is clamped thereon. The bolt threadably engages an entrapped nut supported on the clamping member, the nut being restricted and virtually immovable with respect to the clamping member when engaged by the bolt whereby rotation of the bolt causes the bolt to move axially with respect to the clamping member. When the tool is clamped on the axle adjacent the wheel hub, rotation of the bolt to move it axially in the direction of the hub causes the hub to be pushed away from the position where the tool is clamped on the axle.

The tool of the invention also includes a rotatable spool secured to one of the clamping members for rotation about an axis in a plane perpendicular to the axis of the axle. An elongated flexible strap is provided to pull the wheel hub toward the clamping member, one end of the strap being securable to the wheel hub and the other end of the strap being adapted to be wound on the spool.

Accordingly, a primary object of this invention is to provide a portable wheel hub moving tool which can be operated consistently and safely by a single person and which at the same time is fully effective to move a wheel hub assembly axially along its supporting axle.

Another object of the invention is to provide a wheel hub moving tool which has the versatility and capability of being used to either push or pull the wheel hub along its supporting axis depending upon the initial position of the wheel hub on the axle.

A further object of this invention is to provide a wheel hub moving tool which can be operated with minimum expenditure of effort by the operator.

A still further object of the invention is to provide a wheel hub moving tool which is sufficiently compact that it may be effectively used to axially move a wheel hub to which additional weights have been attached.

A still further object of the invention is to provide a wheel hub moving tool which may be used successfully with a variety of tractor wheel assembly and axle constructions.

Yet another object of this invention is to provide a wheel hub moving tool which is economical in its construction, operation and maintenance.

Other objects of the invention will become apparent from the following detailed description including the drawings, in which:

FIG. 1 is a side elevational view of certain features of the wheel hub moving tool of the invention, showing the tool clamped on a wheel axle for pushing a wheel hub (shown fragmentarily) and illustrating the hub in its position prior to being pushed (solid lines) and after being pushed (dotted lines).

FIG. 2 is an end view taken in the direction of the arrows 2—2 of FIG. 1.

FIG. 3 is a partial plan view taken in the direction of the arrows 3—3 of FIG. 1.

FIG. 4 is an enlarged partial sectional view taken in the direction of the arrows 4—4 of FIG. 1.

FIG. 5 is an enlarged partial plan view taken in the direction of arrows 5—5 of FIG. 1.

FIG. 6 is an enlarged partial sectional view taken in the direction of the arrows 6—6 of FIG. 2, and showing certain elements of the invention in their position during hub pulling.

FIG. 7 is a side elevational view similar to FIG. 1, but showing certain other elements of the invention and illustrating the wheel hub in its position prior to being pulled (dotted lines) and after being pulled (solid lines).

FIG. 8 is a partial perspective view showing the manner of attachment of the pulling strap to the spool.

With particular reference to FIGS. 1 and 2, the wheel hub moving tool of the invention is secured by clamping on axle 12. A hub 14 of a tractor wheel assembly (not completely shown) is also supported on the axle 12. Although locking means for securing the hub on the axle is not shown, the axle 12, as shown in FIG. 2, has a cross-sectional shape which is typical of an axle normally employed with wedge lock clamping means to secure the hub 14 on the axle for rotation therewith. It should be understood, however, that other types of clamping means are commonly employed to secure the hub on its supporting axle and that the tool of the invention may be employed to equal advantage therewith after the clamping means are loosened.

The hub moving tool 10 includes a pair of diametrically opposed clamping members 16 and 18 which are adapted to cooperatively embrace the periphery of the axle 12 to secure the tool on the axle. A pair of spaced-apart parallel vertically disposed threaded bolts 20 depend from the upper clamping member 16, straddle the axle 12, pass through unthreaded cylindrical holes 22 in the lower clamping member 18 and are engaged by threaded nuts 24 which, when tightened on the bolts 20, clamp the tool on the axle 12. The upper ends of the bolts 20 are headless and unthreaded and are rigidly secured in holes 25 in the horizontal flange 28 of the upper clamping member 16 by button welds 26 (FIG. 2)

The lower surface of the upper clamping member 16 is cast with a generally concave configuration 34 (FIG. 2) which includes a pair of downwardly and outwardly diverging planar surfaces 36 which extend axially the full length of the upper clamping member 16. The horizontal flange 30 of the lower clamping member 18 has a thickened or raised portion centrally thereof to provide a planar platform 32 which contacts the axle 12 when the respective clamping members 16 and 18 are drawn together on the axle. By reason of this construction and configuration of the clamping members 16 and 18, when they are secured on the axle 12 they grip the axle 12 along at least three axial lines of tangential contact designated by lines A, B, and C (shown as points A, B and C in FIG. 2). The precise locations of the lines A and B on the diverging surfaces 36 of the upper clamping member 16 will, of course, vary depending upon the diameter of the axle 12. When the tool is securely clamped on the axle 12, the lines of contact A, B, and C are parallel to each other and to the axis of the axle 12 whereby proper alignment of the tool on the axle is maintainable with different axle diameters. The alignment of the tool has been found to be satisfactorily maintainable with axial diameters ranging from 2½ to 4½ inches, which range covers all presently known tractor models.

Because tractor axles are customarily surface hardened, additional clamping means are provided to assist the clamping members 16 and 18 in preventing axial movement of the tool with respect to the wheel hub when the latter is being pushed or pulled along the axle. As seen in FIGS. 1, 2, 5 and 6 a specially designed link chain 38 is pivotally supported at each end so as to depend from a pair of spaced-apart upwardly extending portions 40 of the lower clamping member 18. The link chain 38 consists of a plurality of links 42, each link being elongated and flat and generally in the shape of a figure eight. As best seen in FIG. 5, the links 42 are interconnected and pivotally supported in a staggered relationship on a plurality of threaded bolts or pins 44 carrying nuts 46. The bolts 44 at each end of the chain 38 are received in axial unthreaded cylindrical holes 48 provided in the vertical portions 40 of the lower clamping member 18.

The diameter of the holes 48 and the diameters of the holes in each of the links 42 are slightly larger than the diameters of the bolts 44. Also, each of the links 42 is axially spaced-apart on its respective supporting bolts 44 from its nearest adjacent link to provide an axial clearance therebetween on the order of 10 to 12 thousandths inches. Thus, as seen in FIGS. 2 and 6, when the tool is clamped on the axle 12 the central links of the chain 38 are drawn into contact with a lower peripheral portion of the axle 12. By reason of the axial clearance of the chain links 42 on their respective bolts 44 the slightest axial movement of the tool along the axle 12 causes the links embracing the periphery of the axle to pivot slightly (FIG. 6) from a plane perpendicular to the axis of the axle whereby the sharp edges 50 of each link 42 grip the axle to resist further axial movement of the tool along the axle.

It should be noted that when the sharp edges 50 of the chain links 42 tilt to grip the axle 12 the edges 50 and the surface 32 of the lower clamping member 18 are in alignment and substantially equidistant from the axis of axle 12. This relationship between the link chain 38 and the lower clamping member 18 prevents the lower clamping member from tipping regardless of any variations in axial diameters without interfering with the gripping action of the chain links. It should also be noted that the link chain 38 is located directly under a reinforced rib portion 52 of the upper clamping member 16 to provide the tool assembly with maximum strength. Another advantage provided by chain 38 is that it enables the tool to be clamped on the axle over any mill slots, key ways or other irregularities (not shown) in the surface of the axle.

After the wheel hub moving tool 10 has been clamped on the axle 12, it may be used to either push or pull the wheel hub 14 axially along the axle, as will now be described.

With particular reference to FIG. 1, an elongated threaded bolt 54 having a hex head 56 is supported on the upper clamping member 16 and is axially movable with respect to the upper clamping member. The bolt 54 is supported and guided by two long aligned threadless cylindrical holes 58 and 60 provided in the upwardly extending portions 62 and 64 of the upper clamping member 16. The upwardly extending portions 62 and 64 are axially spaced apart to provide a slot 66 adapted to snugly receive a threaded nut 68 which engages the bolt 54. The nut 68 is thus entrapped in the slot 66 when engaging the bolt 54. The nut is also prevented from rotating with respect to the clamping member 16 by virtue of the diverging surfaces 70 and 72 of the horizontal portion 28 of the upper clamping member 16, which surfaces conform to and engage the hexagonal nut (FIG. 4).

When it is desired to push the hub 14 along the axle 12 the tool 10 is clamped on the axle in an axial position with respect to the hub substantially as shown in solid lines in FIG. 1. If necessary, before tightening the clamping members 16 and 18 on the axle, the tool is rotated on the axle to bring the free end of the bolt 54 into alignment with a planar surface 74 of the hub which is substantially perpendicular to the axis of the axle 12. By using a socket wrench (not shown) to turn the bolt 54, the bolt is threaded through the entrapped nut 68 and the free end of the bolt pushes the hub 14 axially away from the clamping members 16 and 18 (from left to right as shown in FIG. 1). The bolt 54 is preferably supported in the upper clamping member 16 as close to the axis of the axle as possible so as to provide maximum pushing force without cocking the hub in relation to the axle and thus increasing the force which would otherwise be necessary to move the wheel. Also it is in this location that a vertical surface 74 is most commonly found on a wheel hub.

It should be noted that the long holes 58 and 60 which guide the bolt 54 also serve to prevent the bolt from bending as it pushes the wheel hub along the axle. A particular economic advantage results from the use of the entrapped nut 68 as the sole means for providing threads to engage the bolt 54. Since the threaded bolt 54 is made of hardened alloy and the standard nut 68 is relatively soft, the more expensive bolt is protected from wear and the relatively inexpensive nut is readily replaceable.

Although it is generally preferable to move the wheel hub 14 axially in either direction along its axle by pushing the hub as previously described, space limitations may make the pushing operation impossible. If, for example the wheel hub is very close to the body of the tractor, there might be insufficient room to attach the wheel hub moving tool to the axle between the hub and tractor body. In such circumstances it is necessary to use the tool of the invention to pull the hub outwardly away from the tractor body, as will now be described.

As best seen in FIGS. 2 and 3, a spool 76 is pivotally supported between a pair of spaced-apart upwardly extending ears 78 which form part of the cast upper clamping member 16. The spool is supported by and keyed by dowel pins 79 to a pair of opposed hex headed threaded bolts 80 which are inserted through unthreaded cylindrical holes 82 in the ears 78. A diametrical slot 84 is provided in the spool 76 through which may be threaded one end of a flexible fabric strap 86 (FIG. 8). The other end of the strap 86 is provided with a loop 88 through which a bar or pipe 90 may be inserted and secured to the strap for pulling against the back side of the hub 14 after the strap has been inserted through an axial hole 92 between the hub 14 and axle 12. The pipe inserted through the strap loop on the back side of the wheel hub acts to bridge any irregularities in the back side of the hub surface and to transmit the force applied by the spool wound strap evenly to the back side of the wheel hub at a point as near the axle as possible.

With reference to FIG. 7 it will be seen that after the tool has been clamped on the axle 12 in the position shown, and after the strap 86 is extended between the back of the hub 14 and the spool 76, rotation of either hex headed bolt 80, to which the spool is affixed, in the direction of the arrow by employing a socket wrench causes the strap 86 to be wound on the spool and thereby pull the hub 14 from right to left on its supporting axle.

It should be noted that sufficient clearance is provided between the outside diameter of the spool and the upper surface 94 of the upper clamping member 16 to allow for winding up a substantial length of strap. By so providing, the hub may be pulled a substantial distance along its axle without having to unclamp, axially move and reclamp the tool on the axle for further pulling. This clearance, however, should not be so great that the direction of pull departs substantially from a line parallel to the axis of the axle and as close to the axle as possible.

It should also be noted that an efficient desirable direction of applied pulling force may be more rapidly improved by winding the strap 86 on the spool as shown in FIGS. 7 and 8. If, in attaching the strap to the spool, a substantial strap length is first inserted through the slot 84, rotation of the spool to wind the strap thereon in effect winds two thicknesses of strap at the same time, thereby rapidly increasing the radial thicknesses of the wound strap and bringing the direction of the pulling force into its most efficient position.

As previously described, when the hub 14 is being moved by pulling from right to left as shown in FIG. 7, the links 42 of the link chain 38 will tip slightly to the position shown in FIG. 6 whereby the link chain will assist the clamping members 16 and 18 in preventing axial movement of the tool with respect to the axle 12. It should be understood, of course, that if the tool is being employed to push the hub away from the clamping members 16 and 18 as previously described with respect to FIG. 1, the links 42 of the link chain 38 will tip slightly in the opposite direction (not shown) from that shown in FIG. 6 to perform the same axle-gripping function during the pushing operation.

While particular embodiments of the invention have been described, it will be understood, of course, that the invention is not limited thereto, since many modification may be made, and it is therefore contemplated to cover any such modifications as fall within the true spirit and scope of the invention.

What is claimed is:

1. A tool for moving a wheel hub of a farm tractor or the like axially along its supporting axle comprising, in combination, means for clamping said tool on said axle, said clamping means comprising a pair of diametrically opposed clamping members adapted to cooperatively embrace the periphery of said axle along at least three axial lines of contact parallel to the axis of said axle and a link chain pivotally secured to one of said pair of clamping members and adapted to embrace a peripheral portion of said axle, the links of said chain being axially spaced apart slightly on their respective connecting pins whereby when said tool is clamped on said axle the slightest axial movement of said tool along said axle causes the links embracing the periphery of said axle to pivot slightly from a plane perpendicular to the axis of said axle so that the edges of said links grip the axle to resist further axial movement of said tool, means for pushing said hub axially away from said clamping means, said pushing means comprising an elongated threaded bolt supported on one of said clamping members and axially movable with respect to said clamping member, said bolt having an axis of rotation parallel to the axis of said axle and proximate to said axle when said tool is clamped on said axle, said bolt threadably engaging an entrapped nut supported on said clamping member, said nut being restricted with respect to said clamping member when engaged by said bolt whereby rotation of said bolt causes said bolt to move axially with respect to said clamping member, and means for pulling said hub axially toward said clamping means, said pulling means comprising a spool pivotally secured to one of said clamping members for rotation about an axis in a plane perpendicular to the axis of said axle, and an elongated flexible strap, one end of said strap being securable to said hub and the other end of said strap being adapted to be wound on said spool whereby when said tool is clamped on said axle rotation of said spool to wind said strap thereon causes said hub to be pulled axially toward said clamping means.

2. A method of moving a wheel hub of a farm tractor or the like axially along its supporting axle utilizing a portable wheel hub moving tool, said hub having a hole extending generally axially therethrough proximate to said axle, and said hub including means for securing said hub on said axle for rotation therewith in a fixed position along said axle, said tool including means for clamping said tool on said axle and a spool pivotally secured to said clamping means for rotation about an axis in a plane perpendicular to the axis of said axle, and an elongated flexible strap adapted to be wound on said spool, said method comprising the steps of releasing said hub securing means to permit movement of said hub with respect to said axle, clamping said tool on said axle axially spaced from said hub and rotationally disposed so that said spool is radially aligned with said hole in said hub, inserting said strap through said hole and securing one end thereof for pulling said hub, and winding the other end of said strap on said spool to pull said hub toward said clamping means.

3. A tool for moving a wheel hub of a farm tractor or the like axially along its supporting axle comprising, in combination, means for clamping said tool on said axle, means for pushing said hub axially away from said clamping means, and means for pulling said hub axially toward said clamping means, said pulling means comprising a spool pivotally secured to said clamping means for rotation about an axis in a plane perpendicular to the axis of said axle, and an elongated flexible strap, one end of said strap being securable to said hub and the other end of said strap being adapted to be wound on said spool whereby when said tool is clamped on said axle rotation of said spool to wind said strap thereon causes said hub to be pulled axially toward said clamping means.

4. A tool for moving a wheel hub of a farm tractor or the like axially along its supporting axle comprising, in combination, means for clamping said tool on said axle and means for pulling said hub axially toward said clamping means, said pulling means comprising a spool pivotally secured to said clamping means for rotation about an axis in a plane perpendicular to the axis of said axle, and an elongated flexible strap, one end of said strap being securable to said hub and the other end of said strap being adapted to be wound on said spool whereby when said tool is clamped on said axle rotation of said spool to wind said strap thereon causes said hub to be pulled axially toward said clamping means.

5. A tool for moving a wheel hub of a farm tractor or the like axially along its supporting axle comprising, in combination, means for clamping said tool on said axle, means for pushing said hub axially away from said clamping means, and means for pulling said hub axially toward said clamping means, said clamping means comprising a pair of diametrically opposed clamping members adapted to cooperatively embrace the periphery of said axle and a pair of parallel bolts secured to one of said pair of clamping members and adapted to straddle said axle and threadably engage the other of said pair of clamping members, said clamping means further comprising a link chain pivotally secured at each end thereof to one of said pair of clamping members, a central portion of said link chain being adapted to embrace a peripheral portion of said axle to assist said clamping members in resisting axial movement of said tool on said axis while pushing or pulling said wheel hub, said link chain further comprising a plurality of links pivotally interconnected in staggered relationship on a plurality of axially disposed supporting pins, the number of links supported on each such pin being sufficient to occupy substantially the entire free length of said pins, said links on each such pin being slightly and substantially equally spaced apart axially thereon whereby when said tool is clamped on said axle the slightest axial movement of said tool along said axle causes the links embracing the periphery of said axle to pivot slightly from a plane perpendicular to the axis of said axle and causes the edges of said links to grip the axle to resist further axial movement of said tool.

6. A tool for moving a wheel hub of a farm tractor or the like axially along its supporting axle comprising, in combination, means for clamping said tool on said axle, means for pushing said hub axially away from said clamping means, and means for pulling said hub axially toward said clamping means, said pushing means comprising an elongated threaded bolt guided by and axially movable with respect to said clamping means, said bolt having an axis of rotation parallel to the axis of said axle and proximate to said axle when said tool is clamped on said axle, said bolt threadably engaging only a nut which is thereby entrapped on said clamping means, said nut being axially and rotationally restricted with respect to said clamping means when engaged by said bolt whereby rotation of said bolt causes said bolt to move axially with respect to said clamping means, and said nut being unsecured to said tool when said bolt is completely unthreaded therefrom.

7. A tool for moving a wheel hub of a farm tractor or the like axially along its supporting axle comprising, in combination, means for clamping said tool on said axle and means for pushing said hub axially away from said clamping means, said pushing means comprising an elongated threaded bolt guided by and axially movable with respect to said clamping means, said bolt having an axis of rotation parallel to the axis of said axle and proximate to said axle when said tool is clamped on said axle, said bolt threadably engaging only a nut which is thereby entrapped on said clamping means, said nut being restricted with respect to said clamping means when engaged by said bolt whereby rotation of said bolt causes said bolt to move axially with respect to said clamping means, and said nut being unsecured to said tool when said bolt is completely unthreaded therefrom.

8. A method of moving a wheel hub of a farm tractor or the like axially along its supporting axle, said hub having a surface portion proximate to the axle and disposed in a plane substantially perpendicular to the axis of said axle and including means for securing said hub on the axle of rotation therewith, said method comprising releasing said hub securing means to permit movement of the hub with respect to the axle, inserting an elongated threaded bolt through a pair of spaced-apart aligned unthreaded passageways in a bolt guiding means and engaging a nut on the bolt between said passageways to entrap the nut between said passageways and to dispose the bolt parallel to said axle with the free end of the bolt extended in the direction of the hub, clamping said bolt guiding means on the axle adjacent the hub to dispose the free end of said bolt adjacent said surface portion of said hub and threading the bolt further through the entrapped nut whereby the free end of said bolt contacts said surface portion to push said hub axially away from said bolt guiding means.

* * * * *